UNITED STATES PATENT OFFICE.

CHARLES O. PURINTON, OF HARTFORD, CONNECTICUT.

POTTERY AND MAKING THEREOF.

SPECIFICATION forming part of Letters Patent No. 617,299, dated January 3, 1899.

Application filed January 3, 1898. Serial No. 665,472. (No model.)

*To all whom it may concern:*

Be it known that I, CHARLES O. PURINTON, a citizen of the United States of America, residing at Hartford, in the county of Hartford and State of Connecticut, have invented a certain new and useful Improvement in Pottery and the Making Thereof, of which the following is a description.

This improvement enables a potter to produce at a single firing or baking pottery having a lustrous glaze, including decorative effects and colors in variety, using, if he chooses, common "brick-clay" (cheap clay suitable for brick-making) for the base. Whatever grade of clay be used for the base it is to be separated from foreign substances and worked and fitted for pottery-making after the usual fashion, and the clay when thus properly prepared is to be given the desired form or shape in any proper manner—by manipulating it on a potter's wheel, by forming it with molds, by shaping it with the hand or with tools, or otherwise. The article having been formed is then dried after the usual fashion, say for about ten hours at about 85° to 100° Fahrenheit. The article thus formed and dried is now ready to receive the glaze-wash on its surface. The glaze-wash is composed of red lead, (an oxid of lead,) fine sand, (silicious earth,) an oxid or other color-producer for pottery-glazes, and water enough to make the compound about as thick as paint is ordinarily used in being applied with a brush. It is a modification of the improvement that the color-producer can be laid upon the clay base before applying the glaze-wash, so that at first it is under the glaze-wash, or it can be applied after the glaze-wash, so that at first it is over the glaze-wash. By omitting a color-producer a transparent glaze can be produced, leaving the color of the baked clay base showing through it. The glaze-wash can be applied by dipping the clay base therein, or it can be laid on with a brush. When the color-producer is separately applied, it is a general rule—perhaps applicable in all cases—that it can be mixed with water to the paint-like consistency above mentioned and applied with a brush.

When the glaze-wash is to be applied to a surface other than the flat top of an article, it should have an admixture of flour paste, (a paste of flour and water,) the consistency of the whole compound being about that already stated.

It has been found that good working proportions for the ingredients of the glaze-wash are, by measure, seven parts of red lead and nine parts of clean sand in a condition approximating that of a powder. The quantity of oxid or other color-producer to be used is to be governed by what is known in the art as to the quantities of color-producer to be used to produce desired effects; but it is stated here as a standard for judgment in that matter that the addition of one part of black oxid of manganese to the said seven parts of red lead and nine parts of sand will produce an absolutely black glaze. When flour paste is to be added, that should be about one part to said seven parts of red lead and nine parts of sand. The water used is to be enough in quantity to make the whole compound about as thick as paint is ordinarily used in being applied with a brush. As regards the sand, it may be said that in the vicinity of Hartford, Connecticut, where this improvement originated, a clean sand in a condition of fineness approximating that of a powder occurs in a state of nature which is probably nearly pure silica, and it answers admirably for the practice of this improvement. There is also readily to be found in the same locality a light-weight yellowish-brown subsoil, usually underlying loam, which is probably mostly silica and which also answers admirably for the practice of this improvement. It is thought that such sand and such subsoil are to be found in all parts of the world.

All the solid ingredients of the glaze-wash should be in a powdered condition and bolted or sifted before mixing.

The clay base having been formed and surfaced with glaze-wash as described—including the color-producer in, under, or over the glaze-wash—is then fired in a saggar, itself glazed or glaze-washed on the inner side. This firing ordinarily takes from thirty-six to forty hours. The heat is gradually raised to the end of the firing. Any one skilled in the art knows the appearance articles under firing have when they have arrived at the point where they are suitably baked or fired. It is believed that the final heat is the equivalent of that of iron raised to a full welding heat. After the articles are properly fired they are then allowed to cool gradually. This single firing will both bake the clay base and produce a durable lustrous glaze thereon which may be of a color or colors, as desired. No attempt is made herein to deal with the technical chemistry of this glaze, or of its ingredients, or of this process; but in specifying "red lead," "sand," and "flour paste" in the following claims it is intended thereby to include and cover their equivalents.

The improvement claimed is—

1. Pottery composed of a clay base bearing on its surface a glaze composed of red lead and sand applied to the unburned base and both base and glaze being baked or fired at one and the same heat, all substantially as described and for the purposes set forth.

2. Pottery composed of a clay base, bearing on its surface a glaze composed of red lead and sand, both base and glaze being suitably baked or fired at one and the same heat, in a glazed or glaze-washed saggar, all substantially as described and for the purposes set forth.

3. Pottery composed of a clay base bearing on its surface a glaze—applied as a wash—composed of red lead, sand and a color-producer, both base and glaze being suitably baked or fired at one and the same heat in a glazed or glaze-washed saggar, all substantially as described and for the purposes set forth.

4. Pottery composed of brick-clay base bearing on its surface a glaze—applied as a wash—composed of red lead and a color-producer, both base and glaze being suitably baked or fired at one and the same heat in a glazed or glaze-washed saggar, all substantially as described and for the purposes set forth.

5. The process of pottery-making which consists in forming the clay base, putting on that base a glaze-wash composed of red lead and a color-producer and then firing or baking both base and glaze at one and the same heat in a glazed or glaze-washed saggar, all substantially as described and for the purposes set forth.

6. The process of pottery-making which consists in forming a brick-clay base, putting on that base a glaze-wash composed of red lead, sand and a color-producer and then firing or baking the base and glaze at one and the same heat in a glazed or glaze-washed saggar, all substantially as described and for the purposes set forth.

CHARLES O. PURINTON.

Witnesses:
W. E. SIMONDS,
FLORENCE M. BRAGG.